United States Patent
Litvin et al.

[11] Patent Number: 6,146,253
[45] Date of Patent: *Nov. 14, 2000

[54] APPARATUS AND METHOD FOR PRECISION GRINDING FACE GEAR

[75] Inventors: Faydor L. Litvin, Skokie, Ill.; Yih-Jen Chen, Chandler, Ariz.; Gregory F. Heath; Vijay J. Sheth, both of Mesa, Ariz.; Ningxin Chen, Springville, N.Y.

[73] Assignee: McDonnell Douglas Helicopter Company, Mesa, Ariz.

[*] Notice: This patent is subject to a terminal disclaimer.

[21] Appl. No.: 08/844,469

[22] Filed: Apr. 18, 1997

Related U.S. Application Data

[60] Provisional application No. 60/016,052, Apr. 23, 1996.
[51] Int. Cl.$^7$ .................................................... B24B 1/00
[52] U.S. Cl. ................................................ 451/47; 451/56
[58] Field of Search ........................... 451/47, 56, 547, 451/542, 147, 161; 407/24, 26, 28, 23

[56] References Cited

U.S. PATENT DOCUMENTS

| | | |
|---|---|---|
| 2,304,586 | 12/1942 | Miller . |
| 2,711,673 | 6/1955 | Miller . |
| 3,909,990 | 10/1975 | Tersch . |
| 4,175,537 | 11/1979 | Wiener . |
| 4,518,287 | 5/1985 | Bossler, Jr. . |
| 4,635,404 | 1/1987 | Wirz . |
| 4,961,289 | 10/1990 | Sulzer . |
| 4,993,194 | 2/1991 | Cadish . |
| 5,119,594 | 6/1992 | Riha . |
| 5,129,185 | 7/1992 | Erhardt et al. . |
| 5,135,442 | 8/1992 | Bossler, Jr. . |
| 5,175,962 | 1/1993 | Pedersen . |
| 5,178,028 | 1/1993 | Bossler, Jr. . |
| 5,209,020 | 5/1993 | Feisel . |
| 5,233,886 | 8/1993 | Bossler, Jr. . |
| 5,289,815 | 3/1994 | Krenzer . |
| 5,339,794 | 8/1994 | Thyssen . |
| 5,823,857 | 10/1998 | Tan ............................................ 451/47 |

Primary Examiner—Derris H. Banks
Attorney, Agent, or Firm—Stout, Uxa, Buyan & Mullins, LLP; Donald E. Stout

[57] ABSTRACT

A precision grinding apparatus includes a grinding worm for precision grinding a case-hardened face gear. A shaper is first placed into contact with a face gear, to thereby shape a surface of the face gear into a plurality of face gear teeth. The shaper is then removed, and the face gear is case hardened. The grinding worm is disposed in a normal orientation to the case-hardened face gear and includes a spiral tooth extending along a perimeter of the grinding worm. The spiral tooth of the grinding worm is adapted to contact and precision grind the case-hardened gear. A dressing tool includes a protrusion for contacting the spiral tooth of the grinding worm, as the spiral tooth contacts and precision grinds the case-hardened face gear. The dressing tool thus maintains the shape of the grinding worm to within a desired tolerance range.

25 Claims, 7 Drawing Sheets

APPARATUS AND METHOD FOR PRECISION GRINDING FACE GEAR

This application claims benefit of provisional application Ser. No. 60/016,052 filed Apr. 23, 1996.

BACKGROUND OF THE INVENTION

The present invention relates generally to the manufacture of face gears and, more particularly, to a face gear grinding apparatus having both a worm-shaped wheel and a dressing tool for use on the worm-shaped wheel.

DESCRIPTION OF RELATED ART

Figure 1:
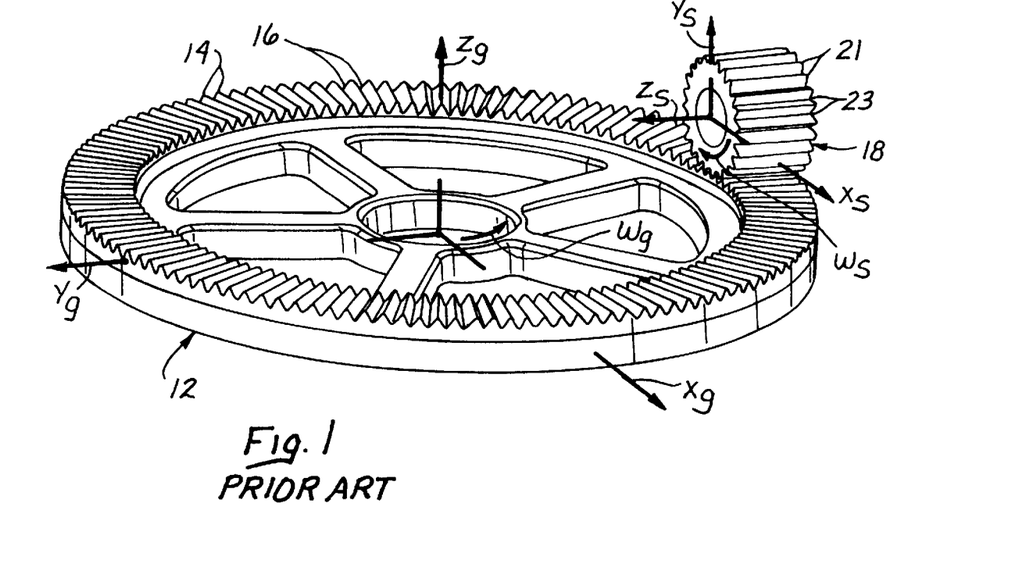
FIG. 1 illustrates a face gear and a shaper of the prior art.

Face gears are widely used in low power applications, but often are not strong enough for use in high power applications. Present manufacturing methods for cutting face gear teeth incorporate hobs or shapers. FIG. 1 illustrates a face gear 12 having face gear teeth 14 and face gear gaps 16. A shaper gear 18 comprises shaper gear teeth 21 and shaper gear gaps 23. The shaper gear 18 rotates about a shaper gear axis of rotation $Z_S$ with a shaper gear rotational velocity $\omega_S$. The face gear 12 rotates about a face gear axis of rotation $Z_g$ with a face gear rotational velocity $\omega_g$. As the shaper gear 18 rolls over the face gear 12, the shaper gear teeth 21 and the shaper gear gaps 23 form the face gear gaps 16 and the face gear teeth 14, respectively. The shaper gear 18 further comprises a shaper gear y-axis $Y_S$ and a shaper gear x-axis $X_S$. The face gear 12 comprises a face gear y-axis $Y_g$ and a face gear x-axis $X_g$.

The face gear teeth 14 and the face gear gaps 16 accommodate a spur gear during regular operation, after the face gear 12 has been shaped by the shaper gear 18 and the shaper gear 18 removed. The conventional face gear teeth 14 and face gear gaps 16, after being formed by the shaper gear 18, are not sufficiently strong for high power applications. The face gear 12 may be case hardened to thereby increase the strength and wear characteristics of the face gear teeth 14 and face gear gaps 16. Case-hardening techniques, such as carburizing and nitriting heat-treat methods, induce distortions in the face gear teeth 14 and gaps 16 of the face gear 12. These distortions prevent smooth operation of the spur pinion on the face gear teeth 14 and, further, the shaper gear 18 is not appropriate for attenuating the distortions in the hardened face gear 12. Grinding processes have been used in the past for finishing gear tooth surfaces in gears other than face gears, when the gears have been heat treated to a high hardness level after being originally cut.

Figure 2:
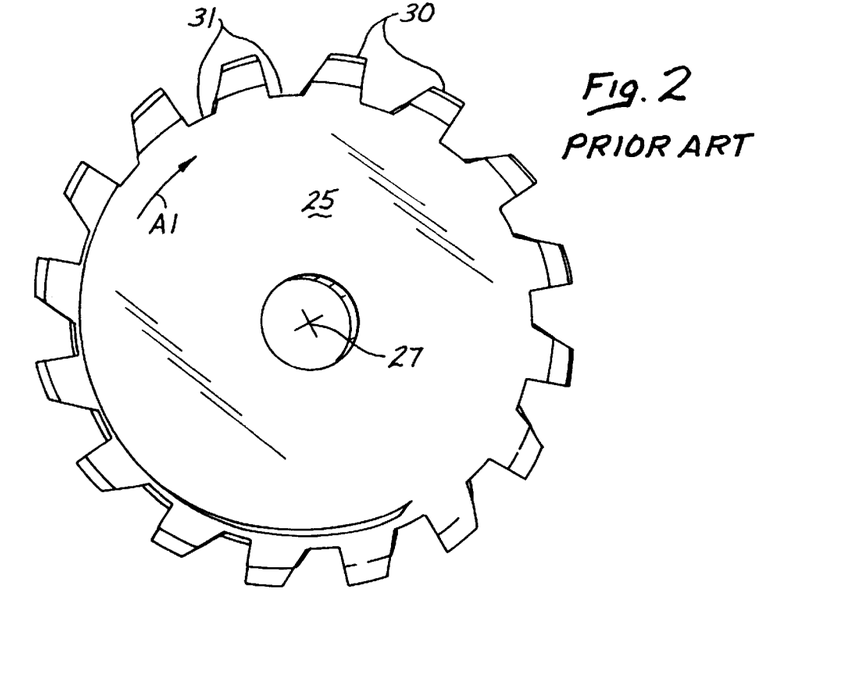
FIG. 2 illustrates a hob of the prior art.

As an alternative to the shaper gear 18, a hob 25 may be used for forming the face gear teeth 14 and face gear gaps. As shown in FIG. 2, the hob 25 typically comprises an axis of rotation 27 and a plurality of hob teeth 30 and recessed areas 31 disposed along the perimeter of the hob 25. As the hob 25 is rotated about the axis of rotation 27 in the direction of the arrow A1, the hob teeth 30 cut into the face gear 12 to thereby form the face gear teeth 14 and face gear gaps 16. U.S. Pat. No. 2,304,588 to Miller discloses such a hob used for cutting teeth into a face gear.

Figure 3:
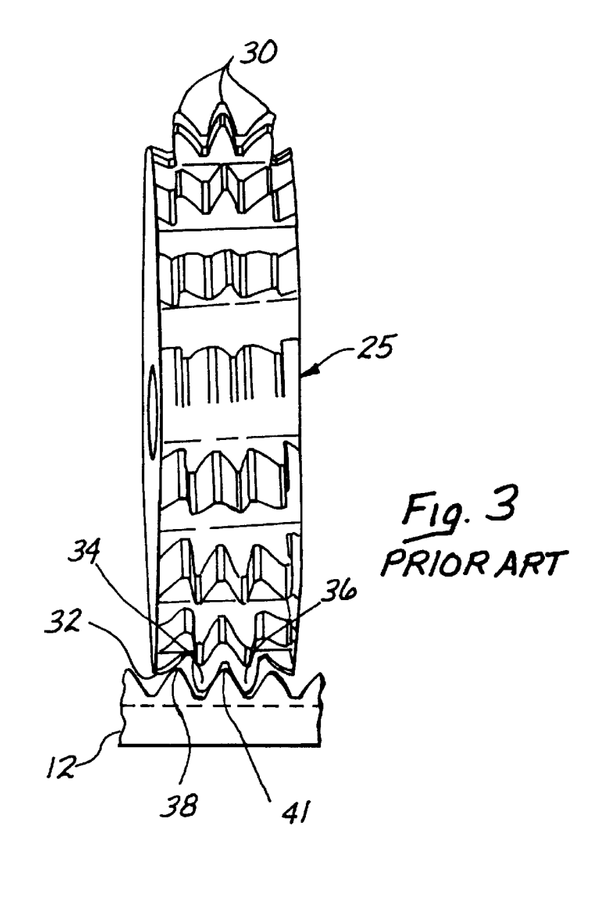
FIG. 3 illustrates a hob and a face gear of the prior art.

An end view of the hob 25 contacting the face gear 12 is illustrated in FIG. 3. The hob 25 comprises a first hob tooth 32, a second hob tooth 34, and a third hob tooth 36. As the hob 25 rotates about the axis of rotation 27 (FIG. 2), the first hob tooth 32 contacts the first face gear tooth 38. Additionally, the second hob tooth 34 and the third hob tooth 36 contact the second face gear tooth 41. The first, second, and third hob teeth 32, 34, and 36 machine (or cut) the first and second face gear teeth 38 and 41. This machining process, however, is not suitable for use on a case-hardened face gear. Additionally, the hob teeth 30 are not properly shaped and, consequently, the face gear teeth 14 of the Miller apparatus are not correctly cut.

Figures 4, 5:
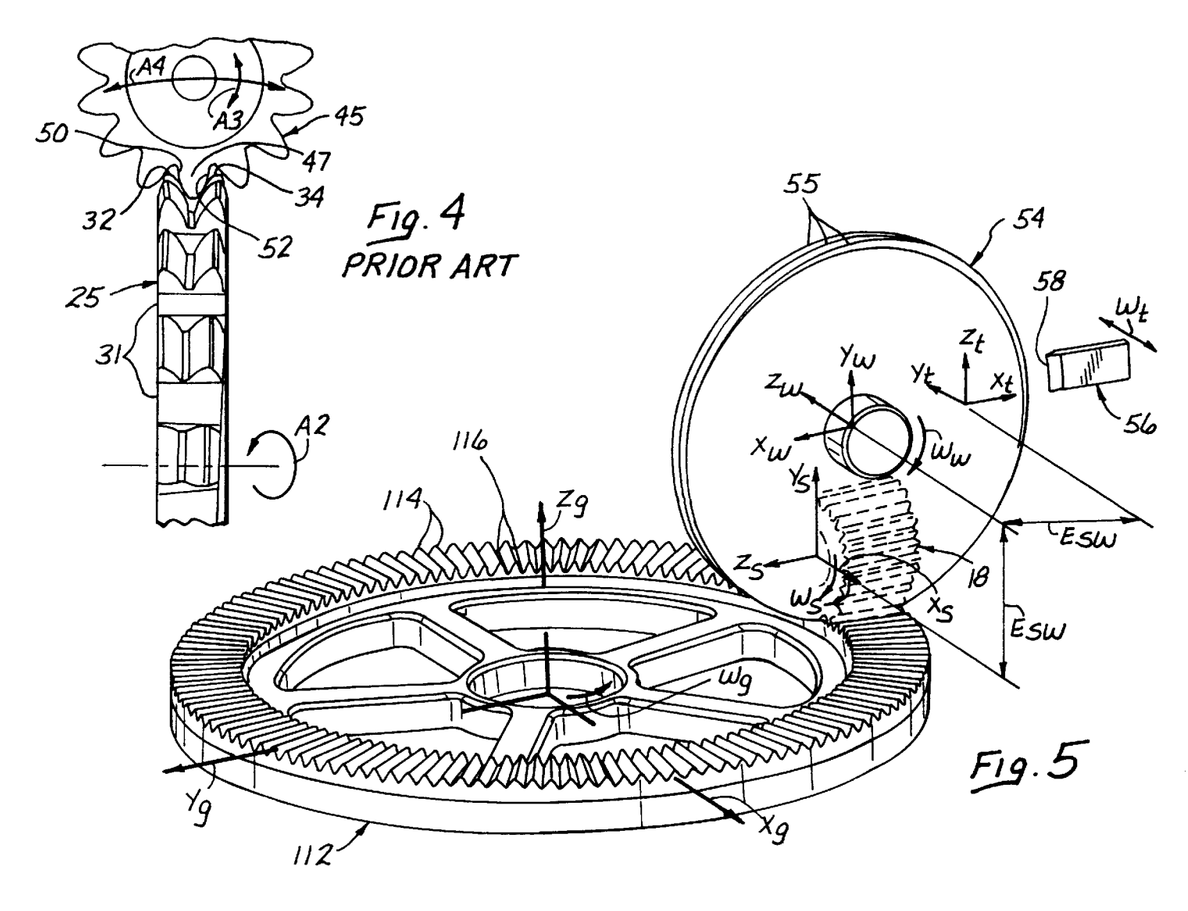
FIG. 4 illustrates a hob and a dressing spur of the prior art.
FIG. 5 illustrates a face gear, grinding worm, and dressing tool according to the present invention.

FIG. 4 illustrates a dressing spur 45, which is used to dress or true the hob 25. As the hob teeth 30 cut into the face gear 12 (FIG. 3), the hob teeth 30 begin to dull or lose their sharp edges. The dressing spur 45 is used to true or dress these hob teeth 30. The dressing spur tooth 47 fits between and contacts the first hob tooth 32 and the second hob tooth 34. The hob 25 is rotated about its axis in the direction of the arrow A2 as the dressing spur tooth 47 contacts the first hob tooth 32 and the second hob tooth 34. This dressing spur tooth 47 comprises a first convex surface 50 and a second convex surface 52. The dressing spur 54 must be moved along the directions of the arrows A3 and A4 to facilitate movement of the double convex dressing spur tooth 47 between the first hob tooth 32 and the second hob tooth 34, as well as between additional hob teeth.

The shape of the double convex dressing spur tooth 47 results in the incorrectly shaped hob teeth 30, which eventually results in the incorrectly formed face gear teeth 14. The errors in the face gear teeth of the Miller patent appear to be at least 40 to 50 microns off from the desired surface. These slight variations result in, among other things, slight variations in the face gear rotational velocity $\omega_g$ during normal operation. Since the hob 25 is not suitable for cutting case-hardened steel, face gears formed by the Miller technique cannot be used in high power applications. Additionally, the dressing spur 45 is not applied to the hob 25 during cutting of the face gear 12. Thus, the shapes of the hob teeth 30 are not accurately maintained during the cutting of the face gear teeth 14 and, further, extra time must be spent after the cutting process to dress the hob 25. Moreover, the cutting of the face gear teeth 14 by the hob teeth 30 may tend to stress the face gear teeth 14. A need exists in the prior art for an apparatus which can generate a hardened face gear with high precision.

SUMMARY OF THE INVENTION

The apparatus of the present invention is adapted for precision grinding a face gear to desired specifications. The apparatus of the present invention is especially suitable for precision grinding a face gear made of case-hardened steel. According to the present invention, a grinding worm tool is used to precision grind the face gear, and a dressing tool can be simultaneously implemented to dress the grinding worm tool.

The precision grinding apparatus of the present invention includes a grinding worm for precision grinding a case-hardened face gear. A shaper is first placed into contact with a face gear, to thereby shape a surface of the face gear into a plurality of face gear teeth. The shaper is then removed, and the face gear is case hardened. The grinding worm is disposed in a normal orientation to the case-hardened face gear and includes a spiral tooth extending along a perimeter of the grinding worm. The spiral tooth of the grinding worm is adapted to contact and precision grind the case-hardened gear. A dressing tool includes a protrusion for contacting the spiral tooth of the grinding worm, as the spiral tooth contacts and precision grinds the case-hardened face gear. The dressing tool thus maintains the shape of the grinding worm to within a desired tolerance range. The grinding worm rotates about a rotational axis of the grinding worm and advances around the case-hardened face gear, to thereby contact and grind each of the teeth of the case-hardened face gear. The protrusion of the dressing tool fits within a gap formed by the spiral tooth of the grinding worm. As the grinding worm rotates about its rotational axis, the protrusion of the dressing tool enters a portion of the gap near a first side of the grinding worm, and eventually exits a second portion of the gap near a second side of the grinding worm.

The case-hardened face gear is adapted to mesh with a spur pinion during regular operation. The spur pinion includes teeth and internal sectors located between the teeth which mesh with the teeth of the case-hardened face gear. Movement of the protrusion of the dressing tool along the gap formed by the spiral tooth simulates movement of the spur pinion over the face gear. The protrusion of the dressing tool is formed to match an internal sector of the spur pinion. Thus, the protrusion of the dressing tool is adapted to snugly fit within the internal sector of the spur pinion. The protrusion of the dressing tool includes a double concave surface.

A rotational axis of the face gear is substantially perpendicular to a rotational axis of the grinding worm. The grinding worm includes a front side, back side, and a circular perimeter connecting the front side to the back side. The spiral tooth is disposed on the circular perimeter of the grinding worm. The spiral tooth begins near the front side of the grinding worm and ends near the back side of the grinding worm. The front side of the grinding worm defines a first plane, and the back side of the grinding worm defines a second plane, with the first plane being substantially parallel to the second plane. A line, which is substantially perpendicular to the first and second planes, is not substantially perpendicular to a radial line of the face gear extending through the rotational axis of the face gear and also passing through a portion of the face gear contacted by at least one tooth of the grinding worm.

According to the method of the present invention, the grinding worm is placed into contact with the face gear to thereby precision grind the plurality of face gear teeth. The dressing tool can be simultaneously placed into contact with the grinding worm to thereby dress the grinding worm. Placement of the dressing tool into contact with the grinding worm while the grinding worm is precision grinding the plurality of face gear teeth maintains the geometry of the teeth of the grinding worm.

The present invention, together with additional features and advantages thereof, may best be understood by reference to the following description taken in connection with the accompanying illustrative drawings.

DETAILED DESCRIPTION OF THE PRESENTLY PREFERRED EMBODIMENTS

Turning to FIG. 5, a grinding worm 54 according to the presently preferred embodiment is illustrated on the face gear 112. The grinding worm 54 rotates about a grinding worm z-axis $Z_W$ with a grinding worm rotational velocity $\omega_W$. The grinding worm further comprises a grinding worm x-axis $X_W$ and a grinding worm y-axis $Y_W$. A plurality of grinding worm teeth 55 contact the face gear 12 as the grinding worm 54 rotates with rotational velocity $\omega_W$, the grinding worm teeth travel within the face gear gaps 116 to thereby rotate the face gear 112 with the face gear rotational velocity $\omega_g$. The face gear teeth 114 fit between the grinding worm teeth 55. A single, spiral gap runs along the outer perimeter of the grinding worm 54 between the grinding worm teeth 55. This spiral gap serves to progress the grinding worm 54 over the various face gear teeth 114. Specifically, as the grinding worm 54 rotates with rotational velocity $\omega_W$, a given face gear tooth enters the spiral gap and travels within the spiral gap for several rotations of the grinding worm 54, until the given face gear tooth exits the spiral gap. The spiral gap begins on a point of the grinding worm perimeter in the positive $Z_W$ direction, and ends on a point of the grinding worm perimeter in the negative $Z_W$ direction. This spiral gap along the perimeter of the grinding worm 54 results in relative movement of the grinding worm 54 in a counterclockwise direction along the face gear 112, as the grinding worm 54 rotates with rotational velocity $\omega_W$.

The face gear 112 is similar to that shown in FIG. 1, except that the face gear 112 has been hardened after initial shaping by and removal of the shaper gear 18 shown in phantom in FIG. 5. The face gear 112 may be hardened by either a carburizing or nitriting heat-treat method, either of which introduces distortions into the geometry of the face gear teeth 114 and face gear gap 116. The grinding worm 54 performs a precision grinding on the face gear teeth 114 to thereby attenuate these distortions. In the presently preferred embodiment, the grinding worm comprises an abrasive-medium type material, such as a dressable CBM-type or other type of material that is conventionally used in spiral bevel and other types of gears.

In addition to the relative counterclockwise movement of the grinding worm 54 along the face gear 114, the grinding worm 54 also moves in a radial direction along the face gear 112. This movement of the grinding worm 54 in the radial direction of the face gear 112 ensures that the entire radial length of each face gear tooth 114 is precision ground by the grinding worm 54. In the presently preferred embodiment, the grinding worm 54 moves in the radial direction at a very slow rate, so that an insignificant amount of radial movement occurs with each rotation of the grinding worm 54 around the face gear 112. For example, the grinding worm 54 may begin rotating about the face gear teeth 114 with its rotational axis $Z_W$ located above the outer edge of the face gear 112. After thirty or more counterclockwise rotations of the grinding worm 54 around the face gear 112, the rotational axis $Z_W$ of the grinding worm 54 may be located substantially over the inner edges of the face gear teeth 114. Alternatively, the grinding worm 54 may be indexed in the radial direction of the face gear 112 with each relative rotation of the grinding worm 54 about the face gear 112. The grinding worm 54 may be indexed ⅟30 of the length of a face gear tooth 114 with each revolution of the face gear 112, for example. This corresponds to a feed rate of 30, but the feed rate may be as low as 10 to 15.

In the presently preferred embodiment, the grinding worm 54 does not move around the circumference of the face gear 112 but, instead, the face gear 112 rotates with the face gear rotational velocity $\omega_g$ beneath the grinding worm 54. The relative motion between the grinding worm 54 and the face gear 112 may be controlled by a gear train, and is preferably controlled by a mechanical control machining process. The rotational velocity $\omega_W$ of the grinding worm 54 is determined by the spiral gap of the grinding worm 54. A programmed computer may be used to control the feed and speed rates. The program of the computer may allow for differently sized gears, different numbers and orientations of teeth, etc. The rotational velocities of the grinding worm 54 and of the face gear 112 may be controlled using feedback loops, for example, in combination with variable speed motors.

The surface of the grinding worm 54 is configured to comply with conjugate meshing of the face gear 112 tooth surface and the shaper gear 18 tooth surface. The dressing tool 56 is used to maintain the grinding worm teeth 55 in a state close to their original shapes, as the grinding worm teeth 55 precision grind the face gear teeth 114. This constant maintenance of the grinding worm teeth 55 by the dressing tool 56 insures that the grinding worm teeth 55 are maintained in their original shape and that the face gear teeth 114 are cut to close tolerance. Thus, the dressing tool 56 of the present invention serves to maintain the grinding worm 54 in essentially its original form throughout the grinding process.

The distance $E_{SW}$ denotes the presently preferred distance between the grinding worm rotational axis $Z_W$ and the dressing tool axis of rotation $Z_t$. This distance $E_{SW}$ is equal to the difference between the radius of the grinding worm 54 and the radius of the shaper gear 18 (shown in phantom). In other words, the distance $E_{SW}$ is he shortest distance between the axis of rotation of the grinding worm 54 and the axis of rotation of the shaper gear 18.

Figure 6:
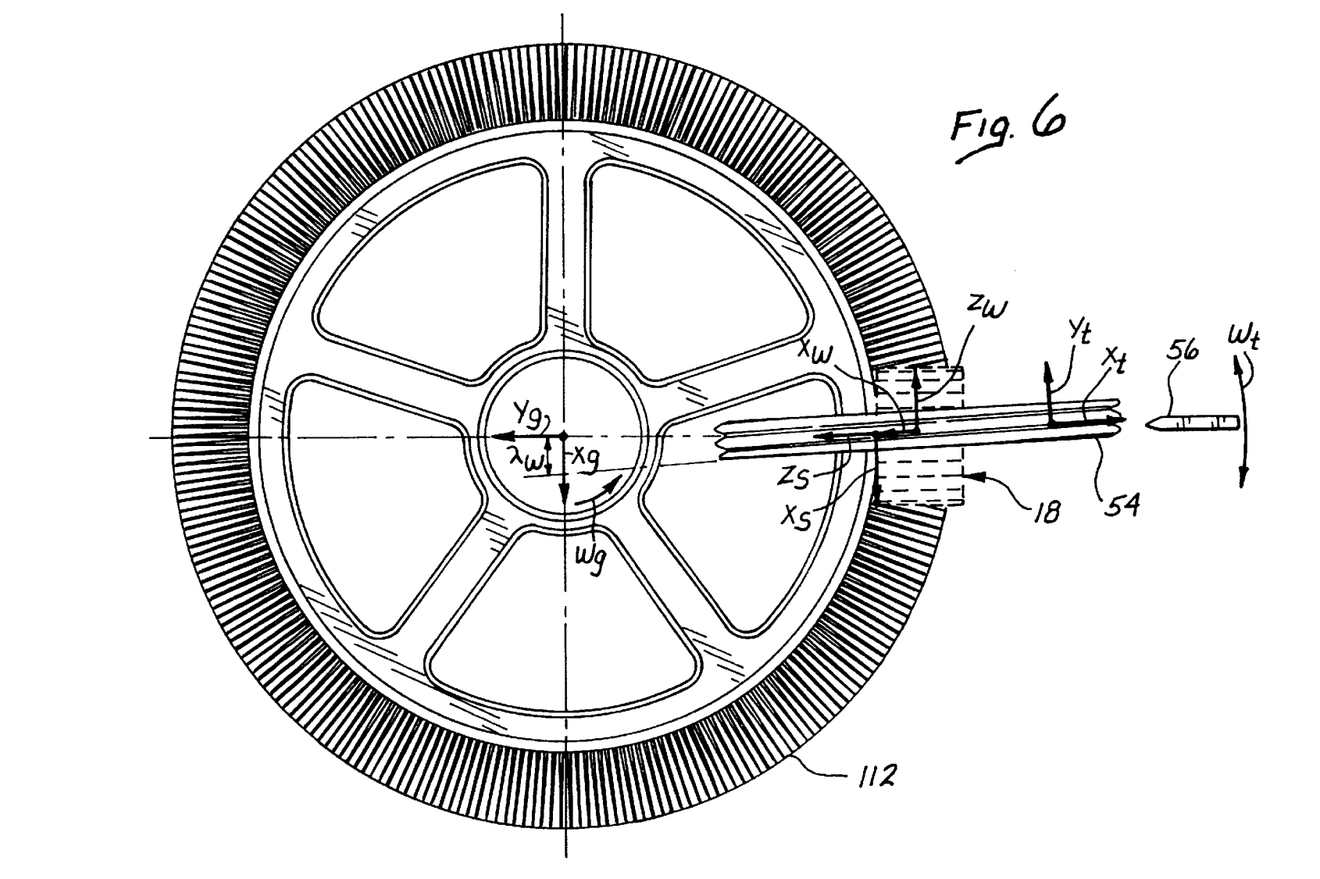
FIG. 6 is a plan view of the face gear, grinding worm, and dressing tool shown in FIG. 5.

As shown in FIG. 6, the grinding worm 54 is placed onto the face gear 112 at an angle slightly off from a radial line passing through the face gear axis of rotation $Z_g$. A line parallel to the grinding worm 54 forms an angle $\lambda_W$ with a line passing through both the face gear axis of rotation $Z_g$ and a point where the grinding worm 54 contacts the face gear 112. The installment angle $\lambda_W$ describes the angle of the grinding worm 54, and is related to the shape of the grinding worm 54 tooth and the shape of the desired face gear 112 tooth. Since the teeth of the grinding worm 54 are spiraled, the grinding worm 54 must be angled relative to the face gear teeth 114 to provide for radial grinding of the face gear teeth 114. The plus sign corresponds to a right hand threaded worm and the minus sign corresponds to a left hand threaded worm. The plus or minus depends on the direction of the spiral in the grinding worm 54. The point where the grinding worm 54 contacts the face gear 112 lies beneath the intersection of the grinding worm x-axis $X_W$, the grinding worm y-axis $Y_W$, and the grinding worm z-axis $Z_W$. The shaper gear axis of rotation $Z_S$ and the grinding worm axis of rotation $Z_W$ are crossed and form an angle of 90 degrees plus or minus $\lambda_W$. If the installment angle $\lambda_W$ were zero, then the angle between the grinding worm axis of rotation $Z_W$ and the shaper gear axis of rotation $Z_S$ would be exactly 90 degrees, but the spiral teeth of the grinding worm require an installment angle $\lambda_W$. The installment angle $\lambda_W$ is determined by:

$$\sin(\lambda_W) = (N_W/N_S) \cdot [r_{ps}/(r_{ps} + E_{SW})]. \qquad \text{Equation 1}$$

The rotational motions of the grinding worm 54 and of the face gear 112 are related as follows:

$$\omega_W/\omega_g = N_g/N_W. \qquad \text{Equation 2}$$

The grinding worm 54 performs translations parallel to the shaper gear axis of rotation $Z_S$. If a helical shaper gear is used, an additional rotation of the face gear 112 is required. In the presently preferred grinding method using a straight shaper gear 18, rotational indexing of the face gear is not required, and a continuous translational motion may be used. The deviations of the ground face gear tooth surface from the ideal face gear tooth surface depend on the number of revolutions of the face gear 112 performed in completing the grinding of the whole radial length of the face gear teeth 114. The deviations are negligible when the number of revolutions of the face gear 112 is in the range of 40 to 50. Of course, other numbers of revolutions may be used.

The shaper gear 18 shown in FIGS. 5 and 6 is shown in phantom for reference only. The shaper gear 18 does not contact the face gear 112 while the grinding worm 54 is contacting the face gear 112. The shaper gear 18 tooth surface generates the ideal tooth surface of the face gear 112 as the envelope to the family of shaper gear 18 tooth surfaces. In the process of generating the teeth of the face gear 112, the shaper gear 18 and the face gear 112 perform rotational motions about their intersecting axis $Z_S$ and $Z_g$ with the following ratio of angular velocities:

$$\omega_W/\omega_g = N_g/N_W. \qquad \text{Equation 3}$$

Figures 7, 8:
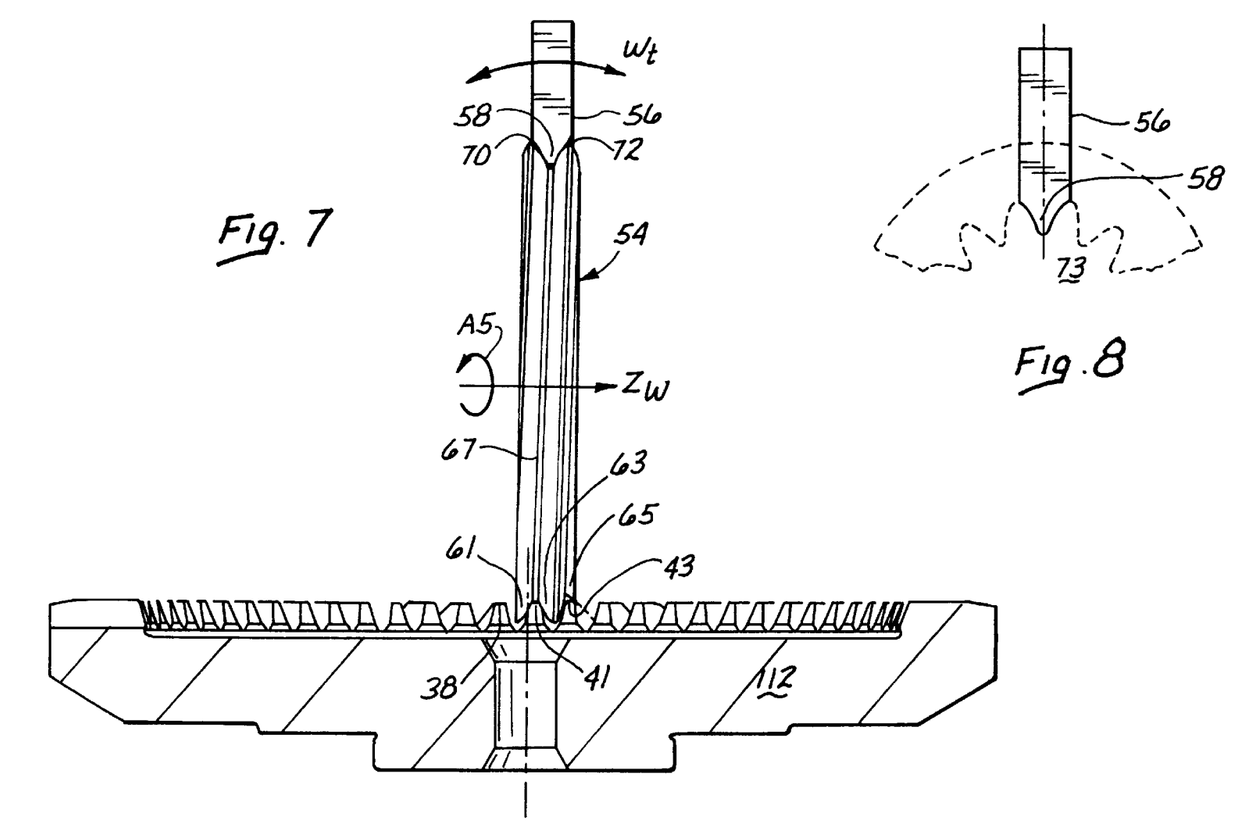
FIG. 7 is a side elevational view of a face gear, grinding worm, and dressing tool according to the present invention.
FIG. 8 illustrates the dressing tool of the present invention, fitting snugly between two teeth of a spur pinion adapted for meshing with the face gear of the present invention.

FIG. 7 illustrates a side view of the grinding worm 54 rotating about the grinding worm axis of rotation $Z_W$ in the direction of arrow A5, and grinding the teeth of the face gear 112. The dressing tool 56 is shown contacting the grinding worm 54 on a top surface thereof, but may be positioned to contact the surface of the grinding worm 54 along any portion thereof, except, obviously, where the grinding worm 54 is contacting the teeth of the face gear 112. The prior art teeth of the hob 25 were dressed with a double convex dressing spur tooth 47 (FIG. 4) and, consequently, the conventional hob teeth 30 (FIG. 3) were not accurately formed. Additionally, the conventional hob teeth 30 were only dressed before or after a cutting procedure and, thus, were not accurately maintained during the machining process. Of course, the presently preferred grinding worm 54 does not cut or machine the face gear 112 (as does the conventional hob) but, rather, precision grinds the face gear 112 after the face gear 112 has been case hardened, for example. The hob 25 of the prior art cannot operate to precision grind a case-hardened face gear.

The grinding worm 54 of the presently preferred embodiment comprises a complex surface, which is suitable for accurately generating the teeth of a case-hardened face gear 112. Although the surface of the grinding worm 54 is complex, this surface can be generated automatically through a simulation of tooth meshing between the dressing tool 56 and the spur pinion 73 (FIG. 8).

A portion of the spur pinion 73 is shown in phantom in FIG. 8. The spur pinion 73 is the actual spur pinion which will mesh with the face gear 112 during normal operation.

As shown in FIG. 8, the dressing tool 56 comprises a double concave surface, which is an internal sector of the spur pinion 73. In other words, the dressing tool tooth 58 is shaped to snugly fit between two teeth of the spur pinion 73. Thus, the dressing tool tooth 58 has an involute profile of an internal sector of the spur pinion 73. This dressing tool tooth 58 is shown in FIG. 7 fitting between a first grinding worm tooth 70 and a second grinding worm tooth 72. Since the dressing tool tooth 58 comprises an involute profile of the spur pinion 73 (FIG. 8), the dressing tool 56 tends to maintain the shape of the grinding worm 54 to a shape similar to that of the spur pinion 73. Consequently, grinding of the face gear teeth 112 by the grinding worm 54 tends to prepare the teeth of the face gear 112 for eventual meshing with the teeth of the spur pinion 73.

As shown in FIG. 7, a single continuous grinding worm gap 67 passes over each of the teeth of the face gear 112. The single continuous grinding worm gap 67 forms a first grinding worm tooth 61, a second grinding worm tooth 63, and a third grinding worm tooth 65. The three grinding worm teeth 61, 63, 65 are shown operating on a first face gear tooth 38, a second face gear tooth 41, and a third face gear tooth 43. Thus, the dressing tool 56 forms the teeth of the grinding worm 54 into the teeth of a simulated spur pinion 73, for subsequent application and grinding of the teeth of the face gear 112.

Figure 9:
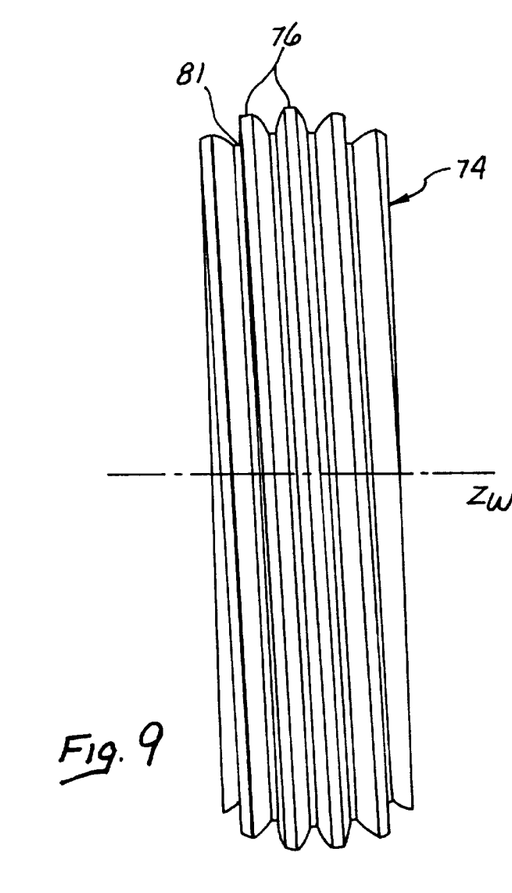
FIG. 9 illustrates a grinding worm according to an alternative embodiment of the present invention.
Figure 10:
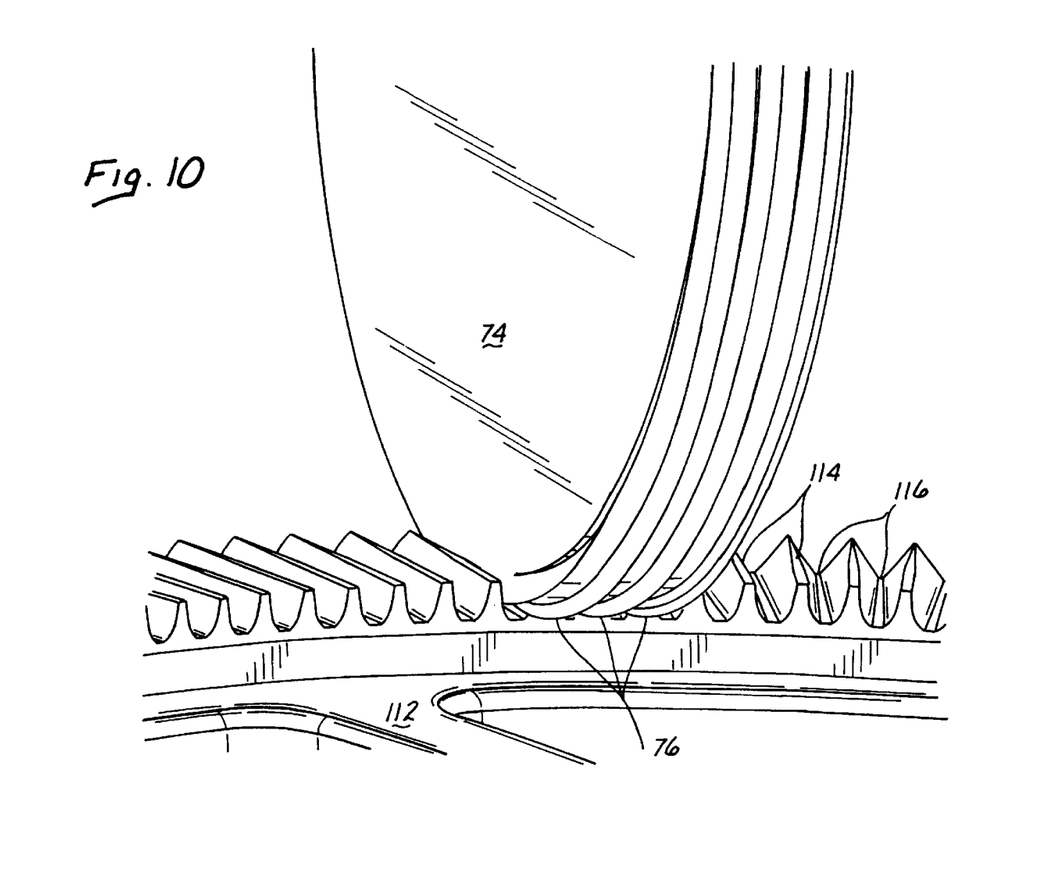
FIG. 10 illustrates the grinding worm of the alternative embodiment grinding the teeth of a face gear.

Although the grinding worm 54 is shown having first, second, and third grinding worm teeth 61, 63, and 65, other embodiments of the grinding worm 54 may comprise fewer or greater teeth. The alternative grinding worm 74 shown in FIG. 9 comprises a single continuous grinding worm gap 81 and at least five grinding worm teeth 76. The alternative grinding worm 74 is shown in FIG. 10 precision grinding the teeth of a face gear 112.

Figure 11:
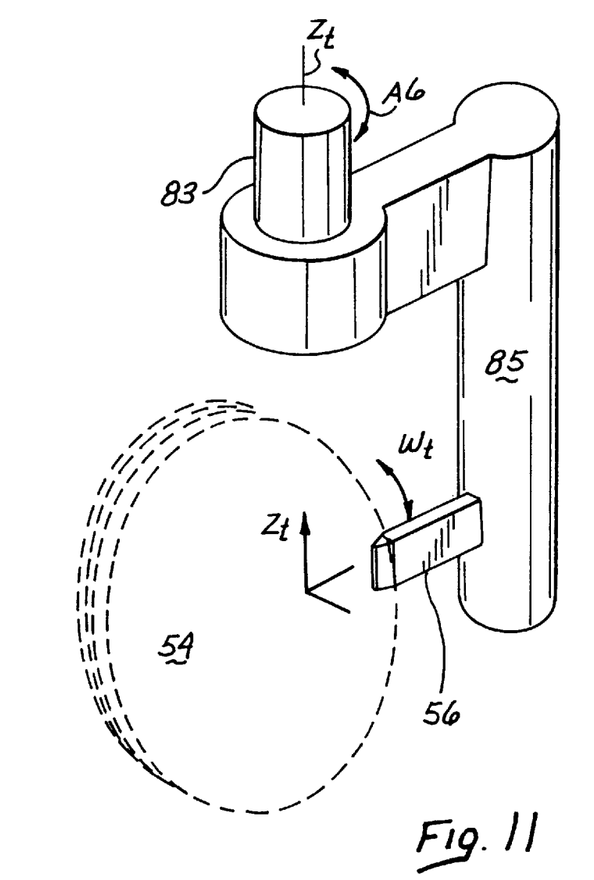
FIG. 11 illustrates an apparatus for placing the dressing tool into contact with the grinding worm, according to the present invention.

Since the axis of rotation $Z_t$ of the dressing tool 56 is actually within a portion of the grinding worm 54, the physical mounting for the axis of rotation of the dressing tool 56 must be offset to avoid interference with the grinding worm 54. FIG. 11 shows one embodiment where the axis of rotation $Z_t$ lies within a pin 83. The pin 83 rotationally holds a dressing tool support mechanism 85, which is connected to the dressing tool 56. The dressing tool support mechanism 85 thus provides for movement of the dressing tool 56 about the dressing tool axis of rotation $Z_t$, with a dressing tool rotational velocity $\omega_t$. The dressing tool 56 thus performs rotational motions about the axis of rotation $Z_t$ in the process of dressing the grinding worm 54. As an alternative to the dressing tool support member 85, other structures may be used, such as a cam member in a plane with the dressing tool defining an arc about the dressing tool axis of rotation $Z_t$. As previously mentioned, the dressing tool axis of rotation $Z_t$ is located a distance $E_{SW}$ from the grinding worm axis of rotation $Z_W$. The rotational motions of the grinding worm 54 and of the dressing tool 56 are related as follows:

$$\omega_W/\omega_t = N_S/N_W. \qquad \text{Equation 4}$$

Figure 12:
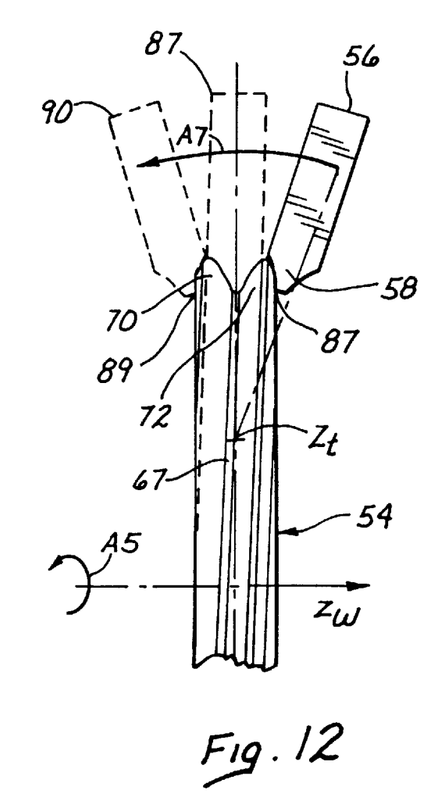
FIG. 12 illustrates movement of the dressing tool along the gap of the grinding worm, according to the present invention.

FIG. 12 illustrates movement of the dressing tool 56 along the single continuous grinding worm gap 67 of the grinding worm 54. The dressing tool tooth 58 enters the single continuous grinding worm gap 67 at an entry point 87, and begins contacting a portion of the second grinding worm tooth 72. As the grinding worm 54 rotates in the direction of the arrow A5 about the grinding worm axis $Z_W$, the dressing tool 56 travels along the single continuous grinding worm gap 67 to an intermediate position, where the dressing tool 56 contacts both the first grinding worm tooth 70 and the second grinding worm tooth 72. The dressing tool is shown at this intermediate position in phantom with the reference number 87. As the dressing tool continues to travel through the single continuous grinding worm gap 67 with rotation of the grinding worm 54, the dressing tool 56 continues to move in the direction of the arrow A7 about the dressing tool axis of rotation $Z_t$ (FIG. 11). The dressing tool exits the single continuous grinding worm gap 67 at the exit point 89, where the dressing tool is shown in phantom with the reference number 90 contacting only the outer portion of the first grinding worm tooth 70.

The dressing tool 56 preferably moves through the entire single continuous grinding worm gap 67 with approximately three rotations of the grinding worm 54. Rocking of the dressing tool 56 about the axis of rotation $Z_t$ (FIG. 11) simulates rocking of the spur pinion 73 (FIG. 8) over the face gear 112. In this simulation, the dressing tool 56 corresponds to a face gear tooth, and the grinding worm tooth corresponds to the spur pinion 73. If the shaper gear 18 (FIG. 6) were used to machine the teeth of the face gear 112, the trajectory of the tooth surface of the shaper gear 18 would have a trajectory defining an envelope surface. This envelope surface defines the tooth geometry of the face gear 112. The grinding worm 54 is designed to generate an envelope surface similar to that of the shaper gear 18. Turning back to FIG. 4, the dressing spur 45 of the prior art does not fully extend between the two hob teeth 32 and 34. Thus, the first and second hob teeth 32 and 34 are not dressed below the "form diameter," which is the lowest point of active profile on the teeth of the hob 25. As shown in FIG. 7, for example, the dressing tool 56 of the present invention fits into the form diameter of the grinding worm 54.

The grinding worm 54 and dressing tool 56 combination of the present invention may be used to fabricate high quality straight faced gears, as well as helical faced gears. These gears may be treated to high hardness levels and precision ground by the grinding worm 54 and dressing tool 56 to thereby accommodate high power applications. Face gears of the prior art are generally suitable for control gears only. Face gears ground to AGMA class 10 quality or higher, using the present invention, can be used in high speed and high load applications wherever beveled gears, which have a more complex geometry, are utilized. Such applications include angular drives involving intersecting axes and crossed axis drive shafts. The potential cost savings of using face gears in lieu of beveled gears is substantial. Additionally, face gears are easier to install, since establishing the pinion and gear mounting distance is less difficult than with beveled gears. Moreover, face gears possess configurational advantages over other gears, such as the capability of driving two face gears from one pinion when the face gears are installed on opposite sides of the pinion. Accordingly, a dual feed drive for additional accessory equipment usage or a split of input engine torque may be utilized to provide lighter intermediate power paths. The split torque drive train may then be recombined prior to the final output. U.S. Pat. No. 5,802,918, filed by the assignee of the present invention, describes such a split torque design concept. This split torque concept can provide substantial weight savings when applied to helicopter transmissions, for example.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

What is claimed is:

1. A precision grinding apparatus, comprising:
   a case-hardened face gear;
   a grinding worm disposed in a normal orientation to the case-hardened face gear, the grinding worm having a spiral tooth extending circumferentially along a perimeter of the grinding worm, the spiral tooth contacting and precision grinding the case-hardened face gear; and
   a dressing tool for dressing the grinding worm while the grinding worm is grinding the case-hardened face gear, the dressing tool having a protrusion for contacting the spiral tooth of the grinding worm.

2. The precision grinding apparatus according to claim 1, the grinding worm rotating about a rotational axis, and
   the protrusion of the dressing tool contacting the spiral tooth when the grinding worm is rotating about the rotational axis.

3. The precision grinding apparatus according to claim 1, the protrusion of the dressing tool fitting within a gap formed by the spiral tooth of the grinding worm, and
   the dressing tool entering the gap near a first side of the grinding worm and exiting the gap near a second side of the grinding worm.

4. The precision grinding apparatus according to claim 3, the case-hardened face gear meshing with a spur pinion, the spur pinion having teeth and internal sectors located between the teeth, and
   wherein movement of the protrusion of the dressing tool along the gap formed by the spiral tooth simulates movement of the spur pinion over the face gear.

5. The precision grinding apparatus according to claim 1, the case-hardened face gear comprising an axis of rotation.

6. The precision grinding apparatus according to claim 5, the case-hardened face gear comprising a plurality of gear teeth, each of the gear teeth extending radially from a center of the case-hardened face gear and being positioned along an outer perimeter of the case-hardened face gear.

7. The precision grinding apparatus according to claim 1, the case-hardened face gear mesh with a spur pinion, the spur pinion having teeth and internal sectors located between the teeth, and
   the protrusion of the dressing tool being formed from an internal sector of the spur pinion.

8. The precision grinding apparatus according to claim 7, the protrusion of the dressing tool snugly fitting within an internal sector of the spur pinion.

9. The precision grinding apparatus according to claim 8, the protrusion of the dressing tool comprising a double concave surface.

10. The precision grinding apparatus according to claim 1, wherein the grinding worm moves in a radial direction along said face gear.

11. An apparatus for precision grinding a face gear, comprising:
    a grinding worm disposed on a face gear, the grinding worm having a front side, a back side, and a circular perimeter connecting the two sides, the circular perimeter comprising a spiral gap beginning near the front side and ending near the back side on the circular perimeter, and extending circumferentially therealong the spiral gap forming at least one grinding worm tooth for contacting and precision grinding a portion of the face gear; and
    a dressing tool having a protrusion for fitting within the spiral gap of the grinding worm.

12. The apparatus for precision grinding a face gear according to claim 11, the face gear being case-hardened, and the protrusion of the dressing tool comprising a double concave surface.

13. The apparatus for precision grinding a face gear according to claim 12, the face gear comprising at least two face gear teeth and a face gear gap located therebetween, and
    the grinding worm tooth snugly fitting into the face gear gap.

14. The apparatus for precision grinding a face gear according to claim 11, the grinding worm comprising a rotational axis,
    the face gear comprising a rotational axis, and
    the rotational axis of the grinding worm being substantially perpendicular to the rotational axis of the face gear.

15. The apparatus for precision grinding a face gear according to claim 11, the front side defining a first plane,
    the back side defining a second plane, and
    the first plane being substantially parallel to the second plane.

16. The apparatus for precision grinding a face gear according to claim 14, a line substantially perpendicular to one of the first plane and the second plane not being substantially perpendicular to a radial line of the face gear, the radial line of the face gear passing through the rotational axis of the face gear and also passing through the portion of the face gear contacted by the at least one grinding worm tooth.

17. A method of precision grinding a plurality of face gear teeth on a face gear, comprising the following steps:
    shaping a plurality of face gear teeth on the face gear;
    hardening the face gear;
    providing a grinding worm;
    placing the grinding worm into contact with the face gear to thereby precision grind the plurality of face gear teeth;
    providing a dressing tool; and
    placing the dressing tool into contact with the grinding worm to thereby true the grinding worm.

18. The method of generating a face gear of high precision according to claim 16, wherein the step of placing the dressing tool into contact with the grinding worm occurs while the grinding worm is precision grinding the plurality of face gear teeth.

19. The method of generating a face gear of high precision according to claim 18, wherein a tooth geometry of the grinding worm is maintained at an essentially original form while the grinding worm precision grinds the dressing tool.

20. The method of generating a face gear of high precision according to claim 17, wherein the step of shaping a plurality of face gear teeth includes the following steps:
    providing a shaper; and
    placing the shaper into contact with the face gear to thereby shape the plurality of face gear teeth on the face gear.

21. The method of generating a face gear of high precision according to claim 20, wherein the step of hardening the face gear is preceded with a step of removing the shaper from contact with the face gear.

22. The method of generating a face gear of high precision according to claim 16, and further comprising a step of moving the grinding worm radially along said face gear during the grinding step.

23. A precision grinding apparatus, comprising:
    a case-hardened face gear;
    a grinding worm disposed in a normal orientation to the case-hardened face gear, the grinding worm having a spiral tooth extending along a perimeter of the grinding worm, the spiral tooth contacting and precision grinding the case-hardened face gear;

the grinding worm moving radially along the face gear as the spiral tooth contacts and precision grinds the face gear; and a dressing tool for dressing the grinding worm while the grinding worm is grinding the case-hardened face gear, the dressing tool having a protrusion for contacting the spiral tooth of the grinding worm.

24. A method of precision grinding a plurality of face gear teeth on a face gear, comprising the following steps:

providing a grinding worm;

placing the grinding worm into contact with the face gear to thereby precision grind the plurality of face gear teeth;

moving the grinding worm radially along the face gear, to ensure that an entire radial length of each face gear tooth is precision ground;

providing a dressing tool; and placing the dressing tool into contact with the grinding worm to thereby true the grinding worm.

25. A precision grinding apparatus, comprising:

a case-hardened face gear which is adapted to mesh with a spur pinion, the spur pinion having teeth and internal sectors located between the teeth;

a grinding worm disposed in a normal orientation to the case-hardened face gear, the grinding worm having a spiral tooth extending along a perimeter of the grinding worm, the spiral tooth adapted to contact and precision grind the case-hardened face gear; and a dressing tool adapted for dressing the grinding worm, the dressing tool having a protrusion for contacting the spiral tooth of the grinding worm, wherein the dressing tool protrusion is formed from an internal sector of the spur pinion.

* * * * *